United States Patent [19]
Schätzler

[11] 3,976,325
[45] Aug. 24, 1976

[54] CRANK DRIVE FOR TWO-WAY OPENABLE SLIDING ROOFS OF AUTOMOBILES

[75] Inventor: Walter Schätzler, Starnberg, Germany

[73] Assignee: Webasto-Werk W.Baier KG, Munich, Germany

[22] Filed: June 2, 1975

[21] Appl. No.: 582,936

[30] Foreign Application Priority Data
June 1, 1974    Germany............................ 2426765

[52] U.S. Cl. .....................................296/137G; 49/353; 49/357; 296/137 H; 292/199; 292/207; 292/DIG. 5
[51] Int. Cl.²............................................ B60J 7/02
[58] Field of Search........ 296/137 G, 137 H, 137 R; 292/DIG. 5, 207, 199, 279; 49/324, 353, 357

[56] References Cited
UNITED STATES PATENTS
3,148,913    9/1964    Golde ............................ 296/137 G
3,829,155    8/1974    Lutz ................................. 296/137 F FOREIGN PATENTS OR APPLICATIONS
1,388,615    1/1965    France .................................. 49/353
1,180,630    10/1964    Germany ........................ 296/137 G Primary Examiner—Robert R. Song
Assistant Examiner—Michael J. Forman
Attorney, Agent, or Firm—Otto John Munz

[57] ABSTRACT

A crank drive assembly for sliding roof mechanisms of automobiles, in which a hand-operated crank drives a push-pull cable, the assembly including a releasable clutch between a drive shaft and a drive pinion transmitting the crank motion to the drive cable, and an arresting mechanism blocking the pinion, whenever the clutch mechanism is disengaged. The clutch mechanism and the arresting mechanism are simultaneously operated by a pivoting motion of the drive crank.

12 Claims, 4 Drawing Figures

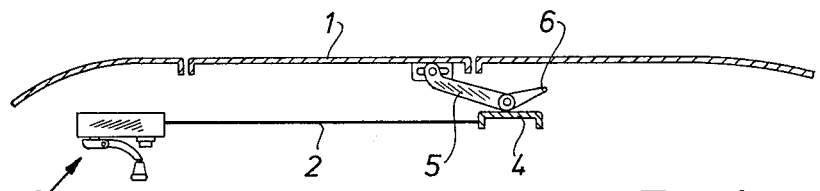
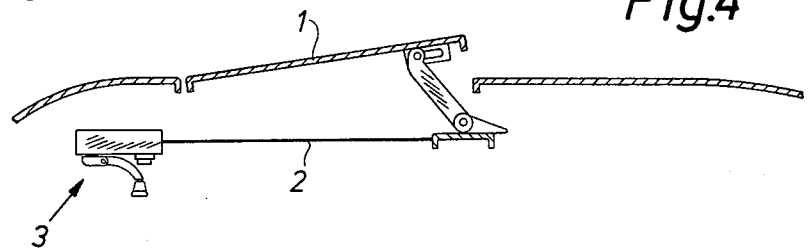
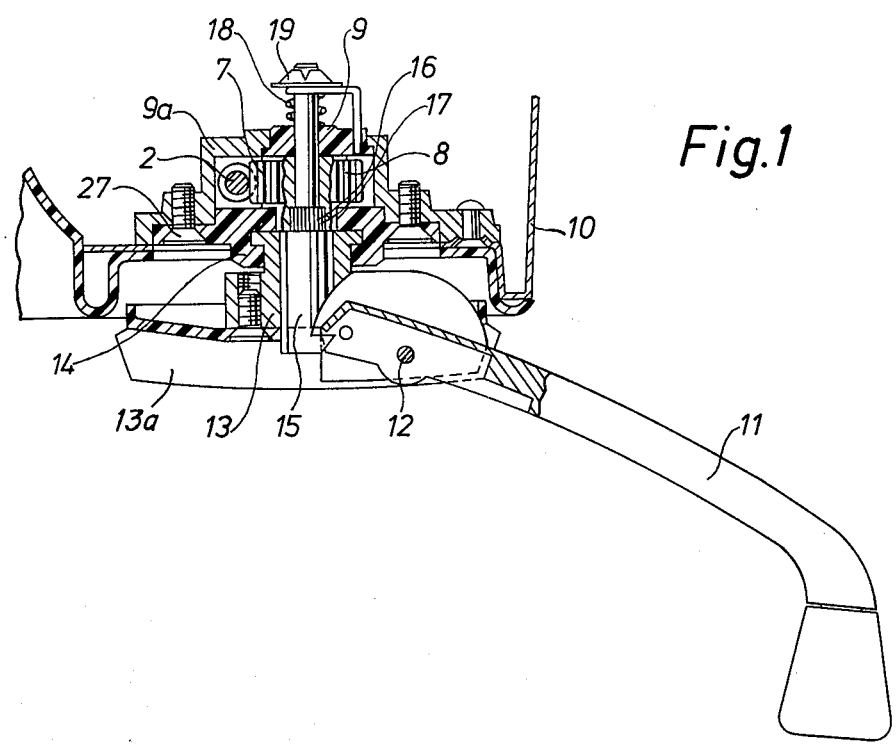

CRANK DRIVE FOR TWO-WAY OPENABLE SLIDING ROOFS OF AUTOMOBILES

BACKGROUND OF THE INVENTION

1. Field of the Invention

The present invention relates to sliding roof mechanisms for automobiles, especially passenger cars, and more particularly to a manually operated crank drive for sliding roofs of automobiles which are openable both upwardly, to serve as a roof vent, and retractable under the rearwardly adjacent stationary roof portion, to serve as a sliding roof panel, or so-called sun roof.

2. Description of the Prior Art

Various manually operated two-way openable sliding roofs for automobiles are known from the prior art. Also known is the use of a crank drive for the operation of this type of sliding roof in conjunction with a push-pull type drive cable which is attached to a transverse bridge member connected to the rear edge of the sliding roof panel by means of a lifting linkage, so that the horizontal motion of the bridge member is converted into both a vertical pivoting motion of the sliding roof panel and a retracting motion of the latter, after it has been lowered to a retracting motion of the latter, after it has been lowered to a level below the stationary roof portion to the rear of the sliding roof panel. Such a mechanism is disclosed, for example, in U.S. Pat. No. 3,829,155.

In connection with crank drives of the above-mentioned type, it is desirable to be able to swing the crank handle into a scuttled, i.e. partially hidden position, for reasons of convenience and safety of the driver and his passengers, as well as for reasons of appearance and/or in order to block the drive mechanism against movements movements. A special recess is provided for this purpose on the stationary roof structure on which the crank drive is mounted. The crank can be swung into this scuttle recess from below, around a horizontal pivot pin connecting the crank arm to the vertically oriented crank shaft of the drive. The scuttled crank handle locks the crank drive against movements resulting from forces acting on the sliding roof panel, as for example, when wind pressure tends to push the upwardly pivoted panel downwardly, toward its closed position.

A crank drive of this type has the disadvantage that the crank can be swung into its recess only when it is angularly aligned therewith, which means that the roof panel operating mechanism can be locked in only a limited number of intermediate panel positions, namely in one given position for each crank rotation. This requirement is normally not felt as a disadvantage in connection with sliding roofs which are only openable in one mode, namely by retraction under the stationary roof portion, where a considerable number of crank shaft revolutions are necessary for a movement of the panel between its extreme positions. In the case of a two-way openable sliding roof, however, where the roof panel is also pivotable upwardly from its closed position, the angular restriction on the scuttling of the drive crank represents a considerable shortcoming. Since the lifting motion of the roof panel requires only a comparatively short longitudinal motion of the transverse bridge member, as few as two crank turns will produce the entire opening motion. With known crank drives, the crank has to be moved as much as one-half turn, in order to reach the angular position in which it can be scuttled. This means, for instance, that in the case of two crank revolutions for the lifting movement, the panel can be locked in only one intermediate lifted position. An additional crank revolution from this position either fully opens the roof panel, or brings it to its closed position.

SUMMARY OF THE INVENTION

Underlying the present invention is the primary objective of improving the prior art crank drive for two-way openable sliding roofs in such a way that the crank can be scuttled into a recess in any desired position of the sliding roof panel.

The present invention proposes to attain this objective by suggesting a crank drive which includes a releasable clutch mechanism between the drive shaft and the drive pinion which transmits the crank motion to the drive cable or to other transmission means actuating the sliding roof mechanism.

In connection with this clutch mechanism, the invention further suggests the use of an arresting mechanism which engages the drive pinion, blocking it against motion, whenever the clutch mechanism is disengaged.

This novel arrangement makes it possible to interrupt the motion of the sliding roof panel in any desired position, and to then move the drive crank to the scuttling position, by disengaging the clutch mechanism, while the roof panel is maintained in the desired position through the action of the arresting mechanism. Although the overall drive mechanism, with its crank, drive pinion, cable, and linkage connections, is normally self-locking, meaning that the drive position is normally maintained against the weight of the sliding roof panel and other forces acting on the latter, there can occur conditions under which the sliding roof panel would tend to move the drive, especially when the former is in its fully raised position and the vehicle, traveling at high speed, creates a sizeable wind pressure against the sliding roof panel.

In a preferred embodiment of the invention, the crank drive is arranged in the forward portion of the vehicle for rotation around a vertical axis. The drive crank, arranged at the lower end of the drive assembly, thus protrudes downwardly into the interior of the vehicle, where it is conveniently accessible for operation of the sliding roof mechanism. The drive crank is pivotably attached to a hub assembly, so that the crank can be swung around a horizontal pivot axis, from an extended position on one side of the principal axis of the drive, to a scuttled position on the opposite side of the vertical axis. The hub assembly in turn is journalled and axially constrained in a stationary portion of the assembly, independently of the drive shaft itself, which latter is rotatably connected to the hub assembly, but axially movable in relation thereto. This relationship allows for the arrangement of a clutch mechanism between the drive shaft and a drive pinion which is loosely seated on the shaft, in an axially fixed position, and which cooperates with the axially movable drive shaft to form a releasable spline-type clutch.

The drive shaft preferably extends axially through the hub assembly, inside which it is rotatably engaged but axially movable, so that its lowermost extremity can cooperate with the pivotable drive crank to derive an axial clutch-disengaging motion therefrom. Thus, if the drive crank pivot is arranged radially outside the principal drive axis, on the side of the crank handle, the drive crank, acting as a double-arm lever, engages a nose on the extremity of the drive shaft, pulling the latter downwardly, when the crank handle is raised. A return spring arranged at the upper end of the drive shaft tends to maintain the clutch mechanism in its engaged position.

Also arranged on the upper end of the drive shaft is an arresting member which moves vertically with the drive shaft, but is not rotatably engaged by the latter. A pin-shaped portion of the arresting member extends parallel to the drive shaft and is guided in a stationary portion of the assembly. This arresting pin moves between two teeth of the drive pinion, when the drive shaft is pulled downwardly for disengagment of the clutch, thereby blocking the drive pinion against rotation.

The entire drive assembly is preferably so designed that the drive crank, hub assembly, drive shaft, pinion, arresting mechanism, and supporting journal members can be pre-assembled into a unit which can be quickly inserted and removed from its place in the roof structure of the vehicle.

BRIEF DESCRIPTION OF THE DRAWING

Further special features and advantages of the invention will become apparent from the description following below, when taken together with the accompanying drawings which illustrate, by way of example, a preferred embodiment of the invention, represented in the various figures as follows:

FIG. 1 shows in a vertical cross section a preferred embodiment of the invention sliding roof of an automobile, the assembly being shown in its normal operating position;

FIG. 3 shows schematically a two-way openable sliding roof mechanism with the sliding roof panel in its closed position; and FIG. 4 shows the mechanism of FIG. 3 with the sliding roof panel in its upwardly raised position.

DESCRIPTION OF THE PREFERRED EMBODIMENT

Figure 2:
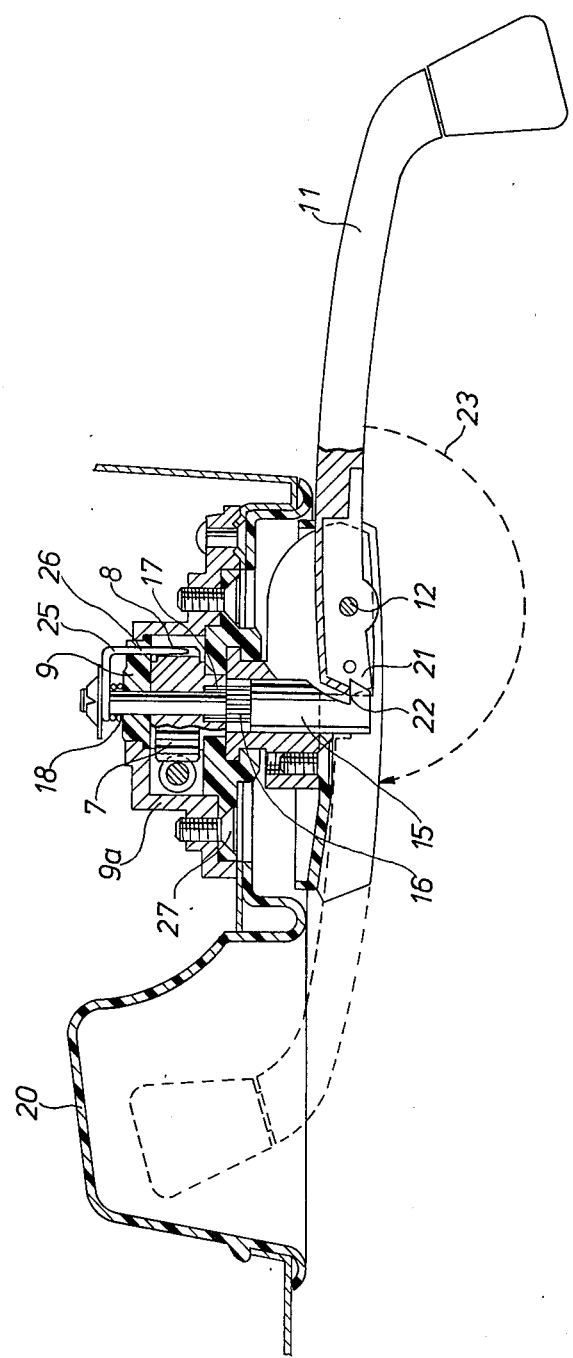
FIG. 2 shows the assembly of FIG. 1 in a position in which the drive crank is rotatable without moving the sliding roof panel, and from which it can be pivoted into a recess.

Referring to FIGS. 3 and 4 of the drawing, there is shown schematically a known arrangement of a two-way openable sliding roof mechanism for automobiles, featuring a sliding roof panel 1 arranged inside a matching opening of an automobile roof. The rear portion of the panel 1 can be either raised, as shown in FIG. 4, to serve as a vent, or it can be lowered below the level of the rearwardly adjacent stationary roof portion, for retraction of the roof panel thereunder, to expose the roof opening. These motions are obtained by means of a drive mechanism which includes a transverse bridge member 4, guided for horizontal fore and aft motion and connected to the rear portion of the roof panel 1 by means of a lifting linkage 5. A push-pull-type drive cable 2, attached to the bridge member 4, transmits a motion force to the latter from a crank drive assembly 3, with which the present invention is concerned. Since suitable versions for all the other elements of such an arrangement are suggested in the prior art (U.S. Pat. No. 3,702,430, 3,789,645, and 3,829,155), the overall purpose and function of such a two-way openable sliding roof mechanism is assumed to be known.

FIGS. 1 and 2 illustrate in detail a preferred embodiment of the novel crank drive assembly for such a sliding roof mechanism, FIG. 1 showing the assembly in its normal operating position, while FIG. 2 indicates a position in which the crank is rotatable without moving the sliding roof panel, until it reaches the position illustrated, from which it can be pivoted into a scuttled position, indicated in FIG. 2 by broken lines.

The drive assembly itself shows the drive cable 2 in operative engagement with a drive pinion 7 arranged on a vertical drive shaft 15. Thus, while the drive cable moves horizontally, the principal axis of rotation of the crank drive is generally vertical. The drive cable 2 and drive pinion 7 are enclosed within a stationary housing 9a, a bearing insert 9 in the upper wall of the housing accommodating a journal for the drive shaft 15. The housing 9a itself is riveted to a recessed portion of the stationary roof frame 10.

The drive shaft 15 is rotatably connected to a drive crank 11 which engages the former through the intermediate of a hub assembly 13 and 13a, to which the drive crank 11 is pivotably attached by a horizontal pivot pin 12. The hub 13 is journalled and axially positioned inside a journal flange 14, preferably of plastic material, the flange 14 being clamped against the housing 9a by means of screws 27. A hub plate 13a, removably attached to the hub 13, carries the pivot pin 12 inside a transverse groove into which the arm portion of the crank 11 recedes in the scuttled position.

The vertical drive shaft 15 reaches downwardly through the hub 13, engaging the latter with a keyed profile for the transmission of rotational motion under axial mobility. A vertically adjacent portion of the drive shaft 15 reaches through the drive pinion 7, the latter being axially confined between the hub 13 and the bearing insert 9. In the lower end portion of its bore, the drive pinion 7 has a female spline portion 17 cooperating with a matching male spline portion 16 on the drive shaft 15. These two elements together define a clutch mechanism which is disengagable, when the drive shaft 15 is pulled downwardly a distance equal to the axial engagement of the male and female splines 16 and 17. For this purpose, the drive shaft 15 has an upwardly facing nose 22 on its lower extremity, positioned to be engaged by a downwardly extending ledge 21 on the innermost extremity of the drive crank 11. A return spring 18 arranged on a portion of the drive shaft 15 which extends above the bearing insert 9 tends to maintain the clutch mechanism in its engaged position.

On the upper end of the drive shaft 15 is further arranged an arresting member 25 of angled outline, having a vertical extension serving as an arresting pin 26, the arresting member being loosely guided on the drive shaft 15, but axially restrained between the upper extremity of the return spring 18 and a retaining end collar 19 on the drive shaft 15.

FIG. 1 shows the crank drive assembly in its normal operating position, the drive shaft 15 being in its raised end position in which the splines 16 and 17 of the clutch mechanism are engaged, so that a rotation of the drive crank 11 around the vertical center axis of the assembly produces a corresponding movement of the sliding roof panel 1. The user may thus bring the sliding roof panel into any desired intermediate opening position, either above the roof opening, in a venting mode, or below the stationary roof structure, in a retraction-opening mode. In most cases, the desired intermediate position of the roof panel does not correspond to a crank position from which the drive crank 11 can be directly swung into the scuttle recess 20 (FIG. 2). It then becomes necessary to disengage the clutch mechanism of the device, by raising the drive crank into the position shown in FIG. 2, whereby the drive shaft 15 is pulled downwardly out of engagement with the drive pin 7, while the arresting pin 26 of the arresting member 25 penetrates between the teeth 8 of the drive pinion 7. In this position, the drive crank 11 can be rotated into the angular position shown in FIG. 2, which is diagonally opposite the scuttle recess 20, without a corresponding movement of the sliding roof panel, which latter is blocked against movement by the arresting mechanism.

The return spring 18 re-engages the drive shaft 15 with the drive pinion 7, as soon as the drive crank 11 is released from its raised position. The arresting mechanism thus comes into operation only when the drive crank 11 is raised and the clutch mechanism is disengaged. This arresting feature is particularly useful, when the sliding roof panel is pivoted upwardly into a venting position, against wind pressure created by high-speed travel. After the drive crank 11 is scuttled inside the recess 20, the latter provides the arresting function on the drive mechanism, by blocking the drive crank 11 against accidental rotation.

From FIGS. 1 and 2 it can be seen that the drive crank 11, hub assembly 13 and 13a, drive shaft 15, drive pinion 7, and the bearing insert 9, constitute a self-contained assembly which is held in position by the journal flange 14 which engages the hub assembly and which is screwed against the housing 9a of the roof structure. The mounting screws 27 of the journal flange 14 are themselves hidden under the hub plate 13a which in turn is screwed to the hub 13. The bearing insert 9 is non-circular in outline, engaging a matching aperture in the end wall of the housing 9a, thereby providing the earlier-mentioned arresting function in cooperation with the arresting pin 26.

It should be understood that the embodiment of the invention illustrated in the drawing and described hereinabove in connection with a push-pull cable drive is not limited to applications using the latter, but that it could be readily adapted to cooperate with other force transmitting means, such as pull cable, rod linkages, and the like. It should also be readily apparent from the drawings that the configuration of the drive crank 11 and hub assembly 13 and 13a need not be such that the scuttling of the drive crank involves a pivoting motion of the latter beyond the rotational axis of the drive, but that the drive crank could also be arranged in a manner similar to that proposed in the German Auslegeschrift (Published Allowed Application) No. 1,430,017, where the crank is scuttled by simply moving it upwardly beyond its normal operating position. In the latter case, the clutch mechanism is preferably so arranged that a downward motion of the drive crank to a level below its normal operating position will cause the disengagement of the clutch mechanism and the simultaneous engagement of the arresting finger.

It should therefore be understood that the foregoing disclosure describes only a preferred embodiment of the invention and that it is intended to cover all changes and modifications of this example of the invention which fall within the scope of the appended claims.

I claim the following:

1. A crank drive assembly for a sliding roof mechanism of the kind used in automobile roofs, where a sliding roof panel is movable into and out of an opening in the stationary roof structure, under the action of a drive mechanism translating the rotating motion of a hand-operable crank into a movement of the sliding roof panel, the crank drive assembly comprising in combination:

a central drive shaft defining a rotational axis for the drive assembly and carrying a drive pinion which is at all times operatively connected to the drive mechanism for the sliding roof panel;

a rotatable drive crank connected to and carried by a hub, the connection between the hub and the drive crank including a pivot connection about which the drive crank is pivotable;

a drive connection between the hub and the drive pinion for transmitting to the pinion the rotational movements of the drive crank;

manually operable clutch means for selectively disengaging the drive connection;

means for selectively arresting the drive pinion against rotational motion in response to the operation of the clutch means which disengages said drive connection; and a recess in the stationary roof structure arranged and shaped in such a way that a portion of the drive crank is receivable therein, when the latter is pivoted about its pivot connection with the hub in the direction of said recess, thereby blocking the drive crank against rotation.

2. A crank drive assembly for a sliding roof mechanism of the kind used in automobile roofs, where a sliding roof panel is movable into and out of an opening in the stationary roof structure, under the action of a drive mechanism translating the rotating motion of a hand-operable crank into a movement of the sliding roof panel, the crank drive assembly comprising in combination:

a central drive shaft defining a rotational axis for the drive assembly and carrying a drive pinion which is at all times operatively connected to the drive mechanism for the sliding roof panel;

a rotatable drive crank connected to and carried by a hub disposed on the same rotational axis, the connection between the hub and the drive crank including a pivot connection about which the drive crank is pivotable in a plane which is substantially coincident with said rotational axis;

a drive connection between the hub and the drive pinion for transmitting to the pinion the rotational movements of the drive crank;

clutch means defined by said drive connection for selectively disengaging the drive connection in response to a pivoting motion of the drive crank about its pivot connection with the hub;

means for selectively arresting the drive pinion against rotational motion in response to the drive crank pivoting motion which disengages said drive connection; and a recess in the stationary roof structure arranged at a distance from the hub and shaped in such a way that a portion of the drive crank is receivable therein, when the latter is pivoted about its pivot connection with the hub in the direction of said recess, thereby blocking the drive crank against rotation;

the drive crank being thus adapted to assume three operatively different positions: a first pivotal position in which the crank is rotatable with the hub, thereby rotating the drive pinion and moving the sliding roof drive mechanism, a second pivotal position in which the crank is rotatable with the hub, but rotatably disengaged from the drive pinion, while the latter is blocked by the arresting means, and a third pivotal position in which the crank is non-rotatably engaged in said recess in the stationary roof structure.

3. A crank drive assembly as defined in claim 2, further comprising spring means for urging the clutch means into the engaged condition of the drive connection.

4. A crank drive assembly as defined in claim 2, wherein the central drive shaft is a part of said drive connection, having a first shaft portion that extends axially through a central bore of the hub and engages the latter for transmission of rotation from the hub to the shaft, while being axially movable relative to the hub;

the clutch means is constituted by cooperating clutch elements defined by the drive shaft and drive pinion, respectively, which clutch elements are axially engageable and disengageable, as a result of the axial mobility of the drive shaft; and the drive shaft and the drive crank define between them means for axially shifting the drive shaft between its engaged and disengaged positions, in response to a pivoting motion of the drive crank between its first and second pivotal positions.

5. A crank drive assembly as defined in claim 4, wherein the drive crank is pivotably attached to the hub at a distance from its rotational axis, having a crank arm extending radially inwardly toward the drive shaft; and the drive shaft protrudes a distance beyond the hub, having near the extremity of its protruding portion an axially inwardly facing nose engageable by the crank arm of the drive crank, the nose and crank arm thereby consituting said drive shaft shifting means.

6. A crank drive assembly as defined in claim 4, wherein the clutch elements of the clutch means have the form of a male spline on the drive shaft adjacent said first shaft portion and a matching female spline in a bore of the drive pinion; and the drive shaft includes a smooth second shaft portion extending beyond its male spline, the drive pinion having a matching smooth bore portion, smaller in diameter than its female spline, the pinion being journalled on said second shaft portion.

7. A crank drive assembly as defined in claim 6, wherein the diameter of the first drive shaft portion and of the cooperating central bore of the hub is larger than that of the male spline, allowing the spline to move into the central bore of the hub, when the clutch elements are disengaged.

8. A crank drive assembly as defined in claim 6, further comprising a housing which is fixedly attached to the stationary roof portion, the housing including: flange means for journalling and axially positioning the hub on one axial end thereof, and an end wall on the opposite axial end of the housing, which end wall axially positions the drive pinion between it and the hub.

9. A crank drive assembly as defined in claim 8, wherein the housing end wall includes a journal bore receiving therein the second shaft portion of the drive shaft;

said second shaft portion protrudes a distance beyond the housing end wall; and the drive shaft includes a compression spring on its protruding portion and spring retaining means on the extremity thereof, the compression spring thus applying to the drive shaft an axial force which tends to engage its male spline with the female spline of the drive pinion.

10. A crank drive assembly as defined in claim 9, wherein the drive pinion arresting means includes an arresting member of which a portion has the form of an arresting pin extending parallel to the drive shaft;

the housing end wall includes a bore guiding therein said arresting pin;

the arresting member is operatively engaged with the drive shaft, so as to move axially in unison therewith; and the drive pinion has a plurality of recesses which are engageable by the arresting pin.

11. A crank drive assembly as defined in claim 10, wherein the arresting member has a planar collar portion from which the arresting pin extends at a right angle, the planar member portion having a bore with which it is engaged over the second portion of the drive shaft, between the compression spring and the spring retaining means, so as to move axially therewith, without being rotatably engaged thereby; and the arresting pin is aligned with the teeth of the drive pinion of axial engagement therebetween.

12. A crank drive assembly as defined in claim 10, wherein the housing end wall further includes a detachable bearing insert as a part of said wall, the journal bore of the drive shaft and the guide bore for the arresting pin being disposed in said bearing insert;

the flange means journalling the hub is detachable from the housing; and the rotatable parts of the drive assembly are so dimensioned and disposed inside the housing that they are insertable thereinto and removable therefrom as a pre-assembled unit.

* * * * *